(12) United States Patent
Benezech et al.

(10) Patent No.: US 6,512,459 B2
(45) Date of Patent: Jan. 28, 2003

(54) ASSEMBLY COMPRISING A WORK CABINET, AN IMPLEMENT FOR RECEIVING PRODUCTS, AND A SYSTEM FOR COMMUNICATING INFORMATION BY RADIOFREQUENCY WAVES, CORRESPONDING CABINET AND IMPLEMENT

(75) Inventors: Philippe Benezech, Nantes (FR); Gilles Mahe, Nantes (FR)

(73) Assignee: Jouan, Saint-Herblain (FR)

( * ) Notice: Subject to any disclaimer, the term of this patent is extended or adjusted under 35 U.S.C. 154(b) by 0 days.

(21) Appl. No.: 09/993,768

(22) Filed: Nov. 27, 2001

(65) Prior Publication Data

US 2002/0065050 A1 May 30, 2002

(30) Foreign Application Priority Data

Nov. 27, 2000 (FR) .............................. 00 15289

(51) Int. Cl.⁷ ............................................... G08B 21/00
(52) U.S. Cl. ................ 340/686.4; 340/568.1; 705/22; 705/28; 705/29; 235/380
(58) Field of Search .................. 705/22, 28, 29; 340/582, 568, 568.1, 825, 568.5, 568.8, 686.4; 235/380, 381, 385, 383

(56) References Cited

U.S. PATENT DOCUMENTS 5,963,134 A  10/1999  Bowers et al. ........... 340/572.1
6,148,291 A  11/2000  Radican ........................ 705/28

FOREIGN PATENT DOCUMENTS

EP     0 712 102 A1    5/1996
WO     WO 96/41296     12/1996
WO     WO 00/33005     6/2000

*Primary Examiner*—Daryl Pope
(74) *Attorney, Agent, or Firm*—Young & Thompson

(57) ABSTRACT

This assembly includes a system for communicating information by radiofrequency waves having at least one element for transmitting or receiving radiofrequency waves which is associated with the cabinet and at least one element for transmitting or receiving radiofrequency waves which is carried by an implement for receiving products so as to determine whether the receiving implement is inserted into the cabinet or is extracted therefrom. The cabinet constitutes a first element and the receiving implement a second element. The communication system includes at least two elements of transmission or of reception, associated with one of the elements and spaced along a direction (D) intended to coincide with the direction of insertion (S), so as to communicate with at least one element for transmitting or receiving radiofrequency waves which is associated with the other of the elements, in an order representative of the insertion or extraction of the implement from the cabinet.

15 Claims, 4 Drawing Sheets

Figure 2:
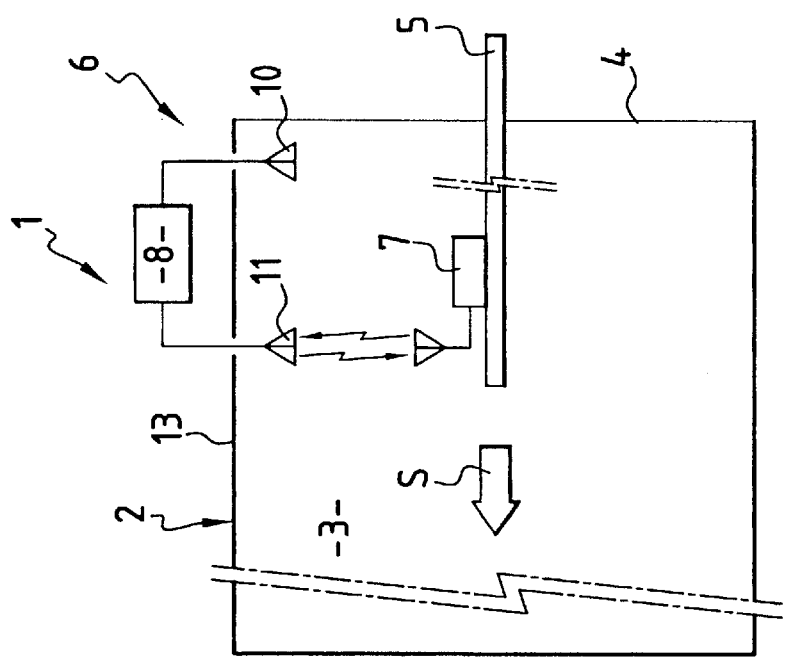

ASSEMBLY COMPRISING A WORK CABINET, AN IMPLEMENT FOR RECEIVING PRODUCTS, AND A SYSTEM FOR COMMUNICATING INFORMATION BY RADIOFREQUENCY WAVES, CORRESPONDING CABINET AND IMPLEMENT

The subject of the present invention is an assembly of the type comprising:

a first element consisting of a work cabinet which delimits internally a workspace and in which cabinet an opening for access to the workspace is made, at least one implement for receiving at least one product, the implement being intended to be inserted through the access opening into the workspace along a direction of insertion, the implement constituting a second element, a system for communicating information by radiofrequency waves comprising at least one means for transmitting and/or receiving radiofrequency waves which is associated with the first element and at least one means for transmitting and/or receiving radiofrequency waves which is associated with the second element so as to communicate information such as to determine whether the receiving implement is inserted into the cabinet or is extracted therefrom.

The invention applies in particular to the processing of biological samples or materials and especially to the culturing, to the preserving and/or to the analysis of cells and/or microorganisms.

An assembly of the aforesaid type is known from the document WO-00/33005. The receiving implements therein are receptacles intended to contain biological products or specimens. Each receptacle is equipped with a radiofrequency transponder for identifying the product which it contains. In its workspace the cabinet comprises a series of trays or shelves each of which carries a detection antenna linked to a radiofrequency receiver so as to interrogate the transponders and thereby monitor the contents of the cabinet.

This document does not indicate how the distinction between entering and exiting movements of receptacles could be effected.

An aim of the invention is to provide an assembly of the aforesaid type which makes it possible easily to distinguish a movement of insertion from a movement of exit from the cabinet of an implement for receiving products.

Accordingly, a subject of the invention is an assembly of the aforesaid type, characterized in that the communication system comprises at least two means for transmitting and/or receiving radiofrequency waves and which are associated with one of the elements and are spaced along a direction intended to coincide with the direction of insertion, so as to transmit and/or receive information from and/or to at least one means for transmitting and/or receiving radiofrequency waves which is associated with the other of the elements, in an order representative of the insertion or of the extraction of the implement from the cabinet.

According to particular embodiments, the assembly can comprise one or more of the following characteristics, taken in isolation or according to all technically possible combinations:

the said two means are means for transmitting two distinct signals, the said two means are carried by the receiving implement, the said two means are means for receiving a signal transmitted by the said means associated with the other of the elements, the said two means are associated with the cabinet, the assembly comprises several receptacles for products each furnished with a means of transmission by radiofrequency waves of an identification signal for the product contained in the receptacle, the receiving implement is a support of receptacles comprising several locations for positioning receptacles spaced along the said direction, and the communication system comprises in the vicinity of each location at least one means of transmission by radiofrequency waves of an identification signal for the relevant location, which means of transmission are spaced along the said direction.

A subject of the invention is furthermore a cabinet for an assembly as defined above, characterized in that it comprises at least two means for transmitting and/or receiving radiofrequency waves and which are spaced along the direction of insertion of an implement for receiving at least one product in the cabinet so as to transmit and/or receive information to and/or from a means of transmitting and/or receiving radiofrequency waves which is carried by the implement, in an order representative of the insertion or of the extraction of the implement from the cabinet.

According to particular embodiments:

the said two means are means for transmitting two distinct signals, the said two means are means for receiving a signal transmitted by a means of transmission associated with the receiving implement.

The invention also relates to an implement for receiving at least one product for an assembly as defined above, characterized in that it comprises at least two means for transmitting and/or receiving radiofrequency waves and which are spaced along a direction intended to coincide with the direction of insertion into a cabinet so as to transmit and/or receive information from and/or to a means of transmitting and/or receiving radiofrequency waves which is associated with the cabinet, in an order representative of the insertion or of the extraction of the implement from the cabinet.

According to particular embodiments:

the said two means are means for transmitting two distinct signals, the said two means are means for receiving a signal transmitted by a means of transmission associated with the cabinet, the implement is a support for receptacles for products each furnished with a means of transmission by radiofrequency waves of an identification signal for the product, the implement comprises several locations for positioning receptacles spaced along the said direction, and the implement comprises, in the vicinity of each location, at least one means of transmission by radiofrequency waves of an identification signal for the relevant location, which means of transmission are spaced along the said direction.

Figure 1:
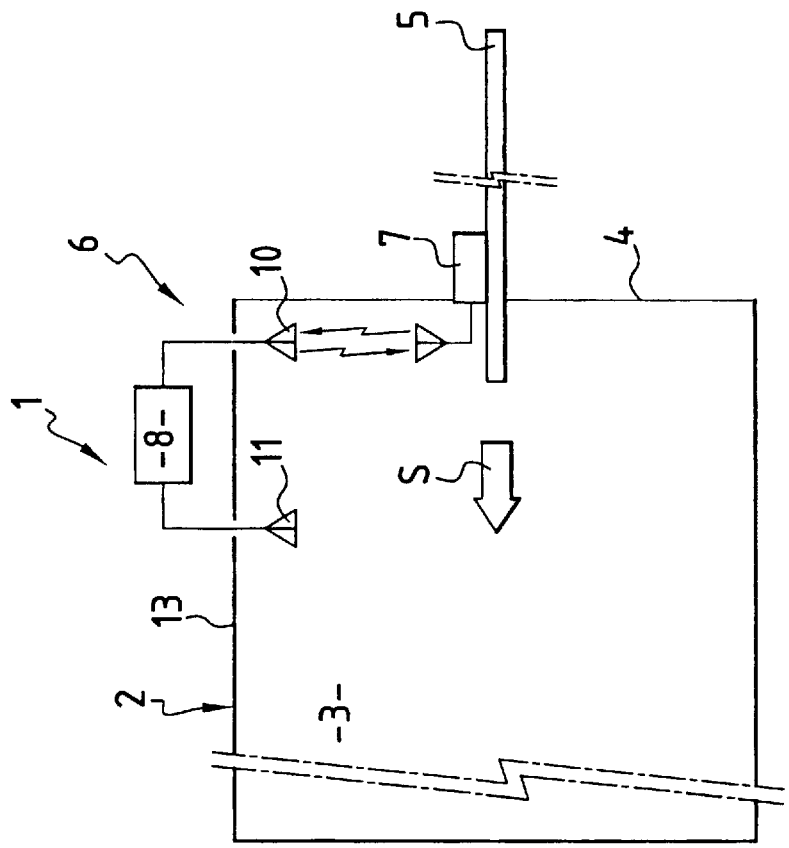
Figure 4:
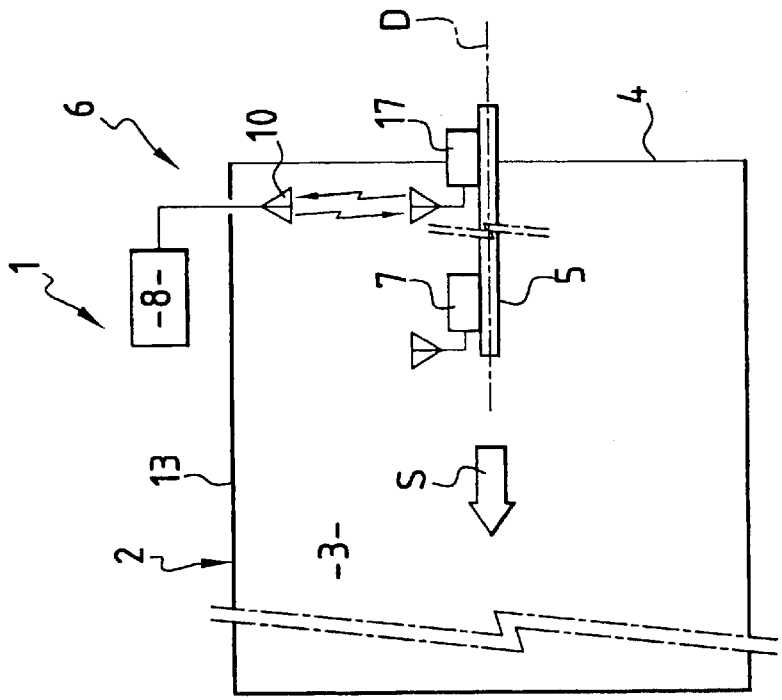
Figure 3:
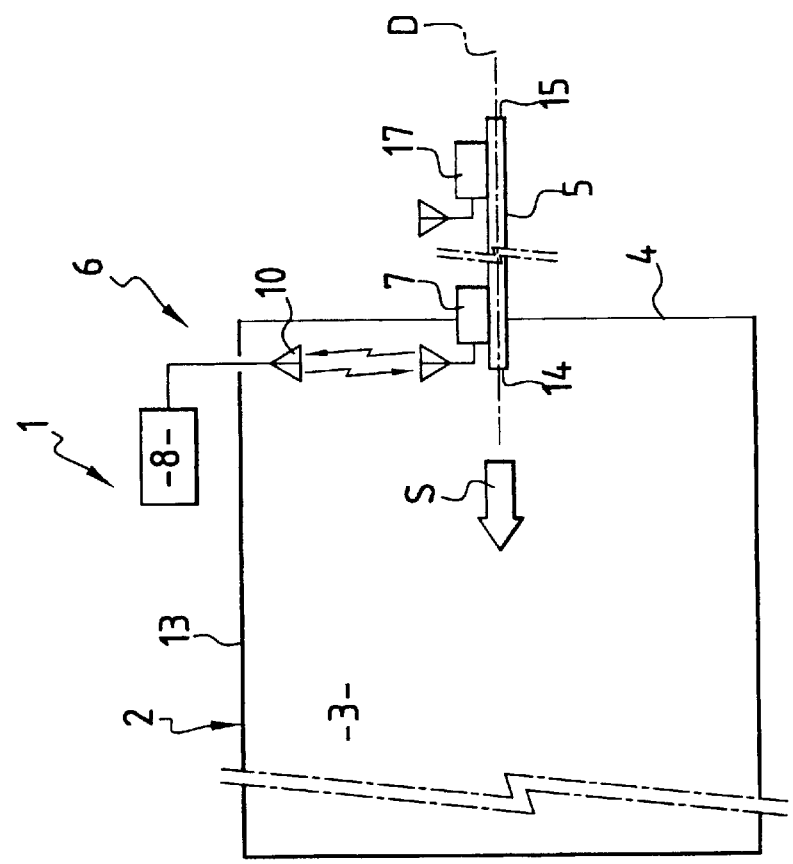
Figure 5:
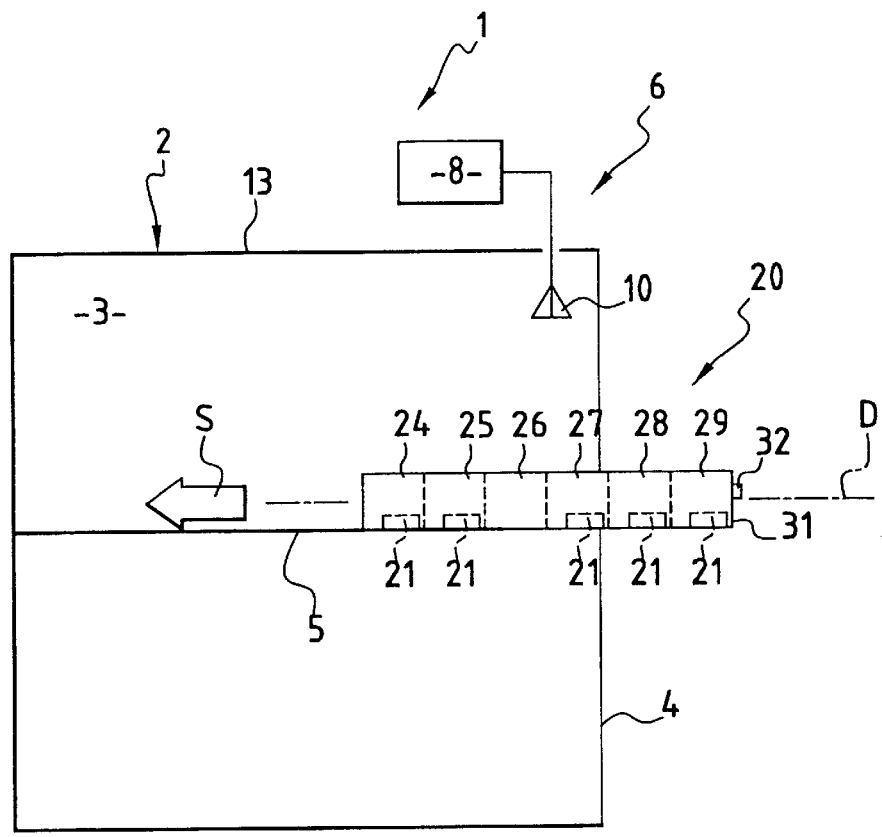
Figure 6:
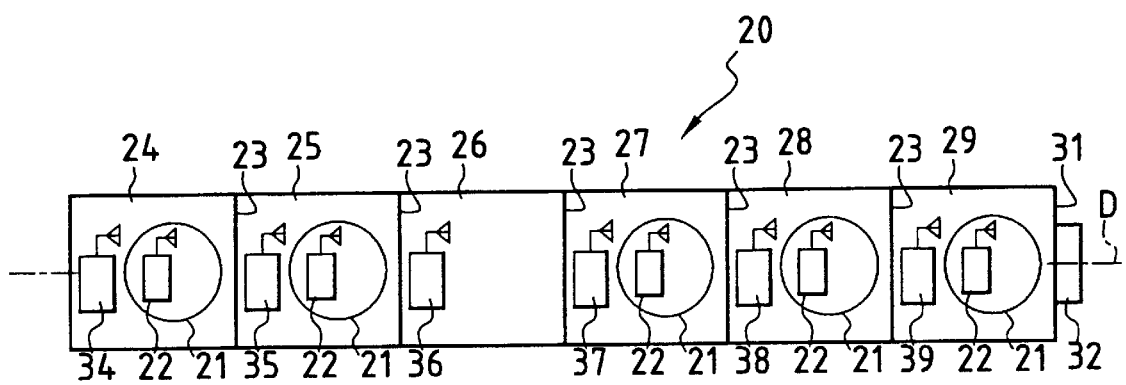
Figure 7:
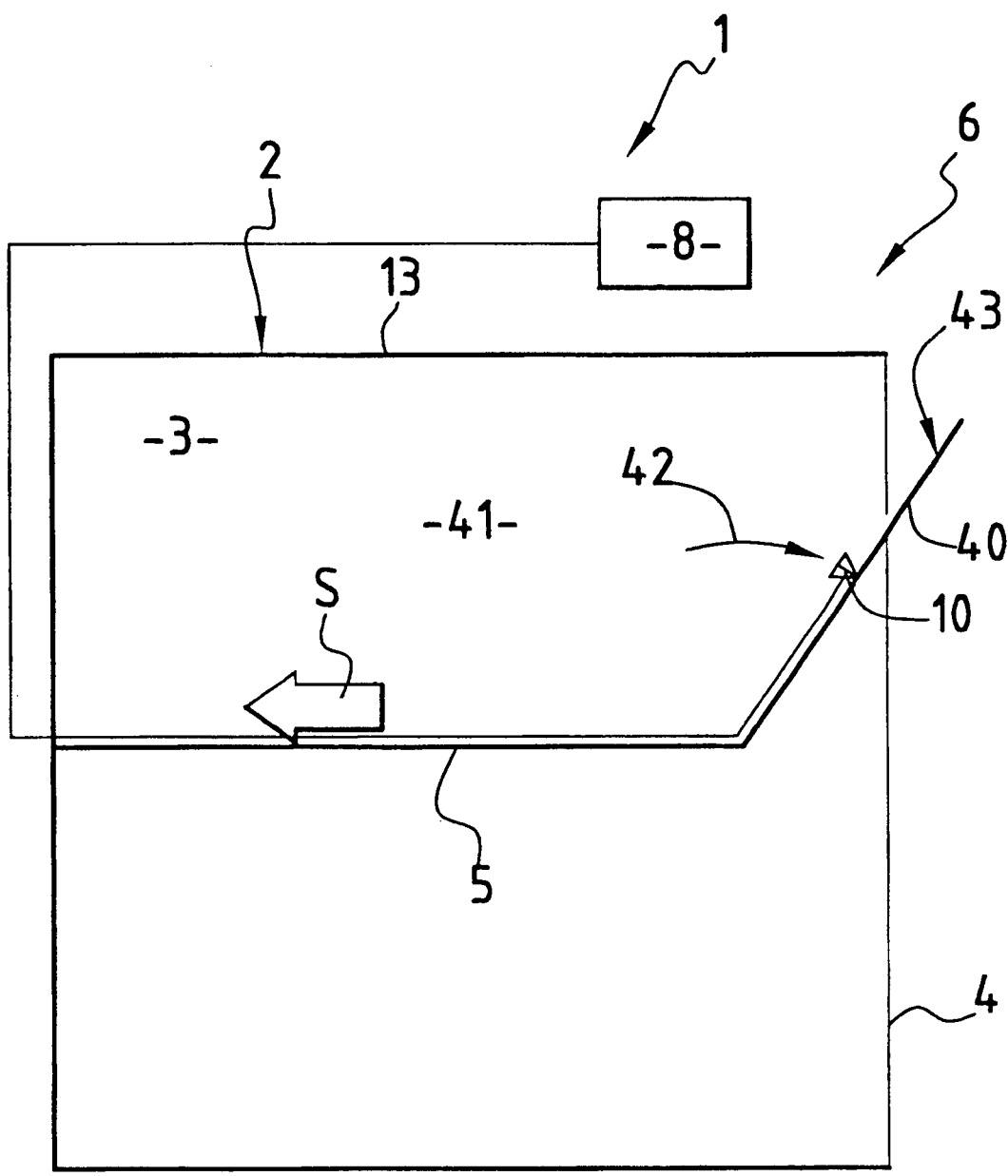

The invention will be better understood on reading the description which follows, given merely by way of example and while referring to the appended drawings, in which:

FIGS. 1 and 2 are two diagrammatic views, partial and lateral, illustrating two successive steps of the insertion of a support tray for receptacles for products into the cabinet of an assembly according to a first embodiment of the invention, FIGS. 3 and 4 are views similar to FIGS. 1 and 2 and illustrate an assembly according to a second embodiment of the invention, FIG. 5 is a view similar to FIG. 3 illustrating a variant of the assembly of FIG. 3, FIG. 6 is a diagrammatic view from above and magnified of the rack for receiving receptacles for products of the assembly of FIG. 5, and FIG. 7 is a diagrammatic view similar to FIG. 5, illustrating a variant of the cabinet of the assembly of FIG. 5.

Depicted in FIG. 1 is an assembly 1 comprising:

a thermostatically controlled cabinet 2, for example refrigerated, delimiting a confined workspace 3 suitable for carrying out work on products, and an access opening 4 of which can be shut off by a movable door (not represented), a tray 5 for supporting receptacles for biological products (not represented), for example Petri dishes, this tray being intended to form a shelf of the cabinet 2, and a system 6 for communicating by radiofrequency waves and for monitoring the contents of the cabinet 2, comprising an identification transponder 7 carried by the tray 5, an information communication and processing unit 8 associated with the cabinet 2, and, for each receptacle, a radiofrequency identification transponder carried by the receptacle.

It is recalled that radiofrequency waves are electromagnetic waves. In the examples described hereinbelow, the frequencies of the waves used may be 125 kHz, 13.56 MHz and 2.45 GHz. Other frequencies may of course be envisaged.

An identifier or identifying tag for the tray 5 is stored in the transponder 7.

Likewise, for each receptacle, an identifier of the product which it contains is stored in the transponder carried by the receptacle.

The unit 8 comprises in a conventional manner a computer, means for storing data in the form of any appropriate memory, a clock, and a module for transmitting and receiving radiofrequency waves. This unit 8 is linked electrically to two antennas 10 and 11 which are spaced apart with respect to the direction of insertion S of the tray 5 into the cabinet 2.

More precisely, these antennas 10 and 11 are disposed in the workspace 3 and are carried by the upper wall 13 of the cabinet 2. Furthermore, they are sufficiently directional and are disposed so that their transmission and reception zones are oriented downwards and do not overlap, or are at least distinct.

The antennas 10 and 11 are situated in the vicinity of the entrance 4 of the workspace 3 of the cabinet 2 so that the tray 5 completely crosses the zones of transmission and reception of the antennas 10 and 11 when it is inserted or extracted from the cabinet.

When the tray 5 is inserted into the cabinet 2 so as to fit it at the location assigned to it from among several possible locations, the transponder 7 and the transponders of the receptacles which it carries firstly enter the zone of transmission and reception of the antenna 10. The unit 8 then interrogates via the antenna 10 these transponders which in response transmit thereto the identifier of the tray 5 and those of the products contained in the receptacles carried by the tray 5.

When the insertion movement of the tray 5 is continued, the transponders exit the transmission and reception field of the antenna 10, then enter that of the antenna 11. The unit 8 then interrogates these transponders via the antenna 11 which again transmit to the unit 8, via the antenna 11, the identifier of the tray 5 and the identifiers of the products contained in the receptacles which it carries.

The unit 8 thus receives these identifiers twice, a first time via the antenna 10, then a second time via the antenna 11. When the tray 5 is extracted from the cabinet 2, the unit 8 receives these identifiers in reverse, a first time via the antenna 11 and a second time via the antenna 10.

It is therefore appreciated that the sequence of reception of the identifiers via the antennas 10 and 11 is representative of the insertion or of the extraction of the tray 5 from the cabinet 2.

Thus, the system 6 makes it possible to distinguish the insertion and the extraction of the tray 5, and of the products contained in the receptacles which it carries, and is so able by virtue of a relatively simple structure.

The unit 8 is adapted to deduce from the information which it has thus received which products are inserted or extracted from the cabinet, on the basis of their identifiers and of their order of reception by the antennas 10 and 11, and on which tray 5 from among other trays they lie in the cabinet 2 or on which tray 5 they were lying, on the basis of the identifier of the tray 5. The unit 8 therefore makes it possible in particular to locate the products contained in the cabinet 2.

The embodiment of FIGS. 3 and 4 is distinguished from that of FIGS. 1 and 2 by the fact that the system 6 comprises two identifying transponders 7 and 17 carried by the tray 5 and that the unit 8 is linked to just one antenna 10.

The transponders 7 and 17 are spaced apart along a direction D intended to coincide with the direction of insertion S of the tray 5 into the cabinet 2.

More particularly, the transponder 7 is placed at the front end 14 of the tray 5 and the transponder 17 is placed at the rear end 15 of the tray 5. The tray 5 possesses for example an oriented structure so as to allow insertion thereof in the direction S and fitting thereof in the cabinet 2 only when the end 14 is situated in front of the end 15 with respect to the direction S.

An identifier or identifying tag for the front end of the tray 5 is stored in a memory of the transponder 7. An identifier for the rear end of the tray 5, distinct from the identifier for the front end, is stored in a memory of the transponder 17.

When the tray 5 is inserted into the workspace 3, after having freed the access opening 4, the transponder 7 firstly enters the transmission and reception field of the antenna 10. The unit 8 then interrogates the transponder 7 which provides it with the identifier for the front end of the tray 5, then the transponder 7 exits the transmission and reception field of the antenna 10.

As the receptacles carried by the tray 5 enter this transmission and reception field, their interrogated transponders provide the unit 8 with the identifiers for the products which they contain.

Next, the transponder 17 enters the transmission and reception field of the antenna 10. The unit 18 interrogates it and provides it with the identifier for the rear end of the tray 5.

Thus, the unit 8 which receives in succession the identifier for the front end then the identifier for the rear end is capable of deducing from the order of reception of these tags that the tray 5 has been inserted into the cabinet 2. Moreover, the unit 8 can deduce from the tags received which products are situated on the tray 5 from among other trays situated in the cabinet 2.

Conversely, when the tray 5 is extracted from the cabinet 2, the unit 8 receives the identifier for the rear end, transmitted by the rear transponder 17, then the identifier for the front end transmitted by the front transponder 7.

Thus, here again the system 6 makes it possible to distinguish, with a relatively simple structure, an entry movement from an exit movement of the tray 5, and of the products contained in the receptacles which it carries.

It is appreciated that the above principles may be applied to receptacles for products or to supports intended to support products directly. These receptacles or these supports are then equipped with front and rear transponders.

According to another embodiment which is not represented, the cabinet 2 can comprise, in place of the unit 8 and of the two antennas 10 and 11 of FIGS. 1 and 2, two radiofrequency transponders for transmitting distinct identifiers. In this case, the tray 5 comprises means for receiving the identifiers transmitted by these transponders and possibly a built-in information processing unit which determines whether the tray 5 is inserted or extracted from the cabinet 2.

According to a variant of this embodiment, the tray 5 comprises a means for receiving the identifiers transmitted by the transponders of the cabinet 2, and a means for returning, for example by radiofrequency waves, these identifiers to a fixed information processing unit situated outside the cabinet, and for example common to an assembly of cabinets 2 or of workstations.

FIGS. 5 and 6 illustrate a rack 20 for receiving receptacles 21 for products, for example Petri dishes, which contain for example biological specimens and which are furnished with radiofrequency transponders 22 for identifying the products which they contain. Such a rack 20, which is open at its upper end, is intended to be disposed in a cabinet 2 such as that described in FIGS. 3 and 4, also furnished with a unit 8 and with an antenna 10, and with shelves 5 disposed in the cabinet 2 and only one of which is represented in FIG. 5. Contrary to the embodiment of FIGS. 3 and 4, the shelves 5 are fixed and are not furnished with transponders. In a variant which is not represented, the upper end of the rack may be closed by a cover which is transparent to the radiofrequency waves used.

The rack 20 has an elongate shape along the direction D intended to coincide with its direction of insertion into the cabinet 2. It possesses a structure compartmentalized in its length direction. Thus, the rack 20 comprises a series of partitions 23 which delimit housings 24 to 29 for receiving receptacles 21.

The rack 20 is intended to be placed on a shelf 5 of the cabinet 2 by inserting it in the longitudinal direction D thereof. Thus, several identical racks 20 may be placed side by side on each shelf 5 of the cabinet 2. To make it easier to manipulate the rack 20, it comprises for example on its rear wall 31 a gripping handle 32.

For each housing 24 to 29, the rack 20 comprises an identifying radiofrequency transponder, respectively 34 to 39, in which an identifier of the relevant housing is stored in memory.

Thus, the identifiers of the housings 24 to 29 are distinct.

When the rack 20 is inserted into the position assigned to it in the cabinet 2, the unit 8 receives, via the antenna 10, and in response to its interrogations, in succession:

the identifier of the front housing 24 and that of the product contained in the receptacle 21 which is housed therein, the identifier of the housing 25 and that of the product contained in the receptacle 21 which is housed therein, the identifier of the housing 26, but no product identifier since this compartment contains no receptacle, the identifier of the housing 27 and that of the product contained in the receptacle 21 which is housed therein, the identifier of the housing 28 and that of the product contained in the receptacle 21 which is housed therein, and the identifier of the housing 29 and that of the product contained in the receptacle 21 which is housed therein.

The unit 8 can deduce from the order of reception of the identifiers of the housings 24 to 29 whether the rack 20 has been inserted or extracted from the cabinet 2.

Moreover, the presence of a transponder transmitting a distinct identifier for each housing makes it possible accurately to locate each product inserted into the cabinet 2, the rack 20 and the housing of this rack where it is situated, and moreover to determine whether a rack housing is empty.

In a variant illustrated by FIG. 7, a door 40 is articulated at one end of each shelf 5 so as to permit and bar access to the compartment 41 delimited in the workspace 3 by the relevant shelf 5.

This door 40 is mobile by rotation, in the direction shown diagrammatically by the arrow 42 in FIG. 7, between a substantially vertical position of closure and a substantially horizontal position of opening, where the door 40 extends the shelf 5.

Each door 40 is then furnished with an antenna 10 on its surface 43 intended to be oriented upwards when it is in the opening position. In practice the thickness of this antenna 10 is very small and it is covered with a protective film.

When the door 40 is opened so as to insert or extract a rack 20 from the compartment 41, the corresponding antenna 10 is then placed automatically in the appropriate position to be able to interrogate the identifiers of the housings of the rack 20 and of the samples which are received therein.

The principles described in regard to FIGS. 5 to 7 may be applied to any implement for receiving products exhibiting several locations for receiving products spaced along a direction D of the implement which is intended to be parallel to the direction of insertion of the implement into the cabinet.

In this case, the transponders associated with each location must also be spaced apart along this direction D.

What is claimed is:

1. An assembly comprising:
   a cabinet defining a work space and that has an opening for access to said work space;
   an implement that is insertable through said opening into said work space along an insertion direction, said implement being adapted to receive a product that is to be placed in said work space; and
   a communication system that includes a first communication device associated with said cabinet and plural second communication devices that are carried by said implement and that each communicate with said first communication device by radio frequency waves, said plural second communication devices being spaced apart on said implement in said insertion direction so as to indicate movement of said implement relative to said work space by communicating with said first transmission/reception device.

2. The assembly of claim 1, wherein said plural second communication devices are transmission devices for transmitting signals which are distinguishable.

3. The assembly of claim 1, wherein said implement comprises plural product receptacles arranged in said insertion direction and wherein each of said plural receptacles includes a different one of said plural second communication devices.

4. The assembly of claim 1, wherein said plural second communication devices are identification transponders and said first communication device comprises an antenna and a radio frequency transmitter/receiver for communicating with said identification transponders.

5. An assembly comprising:
   a cabinet defining a work space and that has an opening for access to said work space;
   an implement that is insertable through said opening into said work space along an insertion direction, said implement being adapted to receive a product that is to be placed in said work space; and
   a communication system that includes plural first communication devices that are associated with said cabinet and a second communication device that is carried by said implement and that communicates with each of said plural first communication devices, said plural first communication devices being spaced apart on said cabinet in said insertion direction so as to indicate movement of said implement relative to said work space.

6. The assembly of claim 5, wherein said plural first communication devices are receiving devices for receiving a signal transmitted by the second communication device.

7. The assembly of claim 5, wherein said second communication device is an identification transponder and said plural first communication devices include plural antennae that are spaced apart in said insertion direction and that are connected to a radio frequency transmitter/receiver for communicating with said identification transponder.

8. A work cabinet comprising:
   walls that define a work space and an opening for access to said work space;
   means for receiving an implement carrying a product that is inserted through said opening into said work space along an insertion direction; and
   plural communication means for communicating by radio frequency waves with a communication device associated with the implement, said plural communication means being spaced apart in the insertion direction so as to indicate movement of the implement relative to said work space.

9. The work cabinet of claim 8, wherein said plural communication means are means for transmitting signals which are distinguishable.

10. The work cabinet of claim 8, wherein said plural communication means comprises antennae that are spaced apart in the insertion direction and that are connected to a radio frequency receiver for receiving a signal from the communication device.

11. An implement for conveying objects into a work cabinet, the implement comprising:
    a surface for conveying objects into a work cabinet when the implement is inserted into the work cabinet in an insertion direction; and
    plural communication means for communicating by radio frequency waves with a communication device associated with the work cabinet, said plural communication means being spaced apart along the implement in the insertion direction so as to indicate movement of the implement relative to the work cabinet.

12. The implement of claim 11, wherein said plural communication means are means for transmitting signals which are distinguishable.

13. The implement of claim 11, wherein said plural communication means are means for receiving a signal from said communication device.

14. The implement of claim 11, wherein said plural communication means are identification transponders.

15. The implement of claim 11, wherein said surface comprises plural product receptacles arranged in the insertion direction and wherein each of said plural receptacles includes a different one of said plural communication means.

* * * * *